(12) United States Patent
Danis et al.

(10) Patent No.: US 10,369,446 B2
(45) Date of Patent: Aug. 6, 2019

(54) BASEBALL PITCH SIMULATION AND SWING ANALYSIS USING VIRTUAL REALITY DEVICE AND SYSTEM

(71) Applicant: TrinityVR, Inc., New York, NY (US)

(72) Inventors: Jeffrey Danis, Mountain View, CA (US); Zachary Lynn, Lexington, MA (US); Julian Volyn, Studio City, CA (US)

(73) Assignee: TrinityVR, Inc., New York, NY (US)

( * ) Notice: Subject to any disclaimer, the term of this patent is extended or adjusted under 35 U.S.C. 154(b) by 0 days.

(21) Appl. No.: 15/964,221

(22) Filed: Apr. 27, 2018

(65) Prior Publication Data

US 2018/0311554 A1 Nov. 1, 2018

Related U.S. Application Data

(60) Provisional application No. 62/597,178, filed on Dec. 11, 2017, provisional application No. 62/491,050, filed on Apr. 27, 2017.

(51) Int. Cl.
*A63B 69/00* (2006.01)
*A63B 60/00* (2015.01)
*A63B 71/06* (2006.01)

(52) U.S. Cl.
CPC .......... *A63B 69/0002* (2013.01); *A63B 60/00* (2015.10); *A63B 71/0622* (2013.01); *A63B 2069/0008* (2013.01); *A63B 2071/0638* (2013.01); *A63B 2220/803* (2013.01); *A63B 2220/805* (2013.01); *A63B 2220/833* (2013.01)

(58) Field of Classification Search
CPC ........ A63B 69/0002; A63B 2071/0636; A63B 60/00; G07F 3/011
See application file for complete search history.

(56) References Cited

U.S. PATENT DOCUMENTS

| 4,577,863 | A | * | 3/1986 | Ito | A63B 69/0002 |
| | | | | | 434/247 |
| 5,443,260 | A | | 8/1995 | Stewart et al. | |
| 6,292,706 | B1 | | 9/2001 | Birch et al. | |
| 6,709,352 | B1 | * | 3/2004 | Albin | A63B 49/12 |
| | | | | | 473/520 |
| 6,895,949 | B1 | * | 5/2005 | Stephens | F41B 4/00 |
| | | | | | 124/6 |

(Continued)

OTHER PUBLICATIONS

Video Integration Pipeline—Product Development, DiamondFX—Confluence, downloaded from internet Apr. 16, 2018, https://trinityvr.atlassian.net/wiki/spaces/PD/pages/148701185/Video+Integration+Pipeline.

(Continued)

*Primary Examiner* — David L Lewis
*Assistant Examiner* — Robert E Mosser
(74) *Attorney, Agent, or Firm* — Fox Rothschild LLP

(57) ABSTRACT

A virtual reality baseball system uses a virtual reality device to present a simulated pitch to a batter. The system also includes sensors that are attached to a bat, and optionally external sensors, that sense movement of the bat. The system will generate and present a simulated pitch from a selected pitcher. The simulated pitch simulates attributes of a pitch of the selected pitcher that correspond to a particular batting simulation scenario. The sensors are configured to track movement of bat when a user swings at the simulated pitch.

21 Claims, 11 Drawing Sheets

(56) References Cited

U.S. PATENT DOCUMENTS

| | | |
|---|---|---|
| 8,834,303 B2 | 9/2014 | Jennings |
| 9,573,035 B2 | 2/2017 | DeCarlo |
| 9,597,570 B2 | 3/2017 | Altshuler et al. |
| 9,604,136 B1 | 3/2017 | Ricky |
| 9,643,049 B2 * | 5/2017 | Bentley .............. A63B 24/0003 |
| 9,737,817 B1 | 8/2017 | Ricky |
| 2005/0113158 A1 | 5/2005 | Sterchi et al. |
| 2009/0029754 A1 | 1/2009 | Slocum et al. |
| 2009/0258734 A1 | 10/2009 | Souders et al. |
| 2010/0298958 A1 | 11/2010 | Connelly |
| 2015/0257682 A1 | 9/2015 | Hansen et al. |
| 2016/0158619 A1 * | 6/2016 | Polstein ............. A63B 69/0002 473/457 |
| 2016/0217325 A1 | 7/2016 | Bose et al. |
| 2016/0354664 A1 | 12/2016 | DeCarlo |
| 2017/0039881 A1 | 2/2017 | Belch et al. |
| 2017/0151484 A1 * | 6/2017 | Reilly ................ A63B 71/0622 |
| 2017/0255261 A1 * | 9/2017 | Huang .................... G06F 1/163 |
| 2017/0304705 A1 | 10/2017 | Hermandorfer |

OTHER PUBLICATIONS

Biomechanics Integration Pipeline—Product Development, DiamondFX—Confluence, downloaded from Internet Apr. 16, 2018, https://trinityvr.atlassian.net/wiki/spaces/PD/pages/325386244/Biomechanics+Integration+Pipeline.

Advanced Visualizations—Product Development, DiamondFX—Confluence, downloaded fron Internet Apr. 16, 2018, https://trinityvr.atlassian.net/wiki/spaces/PD/pages/68050137/Advanced+Visualizations.

Information about Related Patents and Patent Applications, see section 6 of the accompanying Information Disclosure Statement Letter, which concerns Related Patents and Patent Applications.

* cited by examiner

BASEBALL PITCH SIMULATION AND SWING ANALYSIS USING VIRTUAL REALITY DEVICE AND SYSTEM

RELATED APPLICATIONS AND CLAIM OF PRIORITY

This patent document claims priority to: (1) U.S. provisional patent application No. 62/491,050, filed Apr. 27, 2017; and (2) U.S. provisional patent application No. 62/597,178, filed Dec. 11, 2017. The disclosure of each priority document is fully incorporated into this document by reference.

BACKGROUND

Conventional baseball simulators do not have sufficiently accurate pitching simulation and hitting data and cannot effectively help enhance players live performances. Virtual reality simulators have been around for a few years. Baseball simulators, however, have not had accurate readings and simulations. Current baseball simulators do not adequately prepare players for matchups against certain pitchers as well as live conditions. For example, current systems cannot realistically simulate what it is really like to play against famous Major League Baseball pitchers and hall of fame stars, such as Nolan Ryan or Sandy Koufax. Similarly, current systems cannot adequately prepare players for certain pitchers that they may go against in the near future, in the World Series, or during the regular season.

Conventional baseball simulation systems also differ from reality, as baseball players have not been able to use their own equipment during baseball simulations. Instead, they must use special equipment designed for the simulation system. Therefore, a system is lacking that can provide accurate and realistic baseball simulations using virtual reality with ability for an individual to use their own equipment.

This document describes hardware, systems and methods directed to addressing some or all of the issues described above, and/or which may provide additional or alternative benefits.

SUMMARY

This document describes a method and system that presents virtual pitching to a baseball batter in real time with pitches that provide an accurate representation of known pitchers, pitching styles, and/or pitch speeds.

A virtual reality baseball system includes a bat mount configured to be removably secured to a bat. The bat mount may include a sensor. The bat mount is configured to be attached to a knob of the bat such that it is not intrusive to a swing of the bat. A sensing device is configured to track movement of the sensor in the bat mount when the bat mount is removably secured to the bat. A processor implements programming instructions that are configured to receive tracked movement data of the sensor to determine a position of the bat. The system will present a simulated pitch from a selected pitcher on a user interface. The simulated pitch simulates attributes of a pitch of the selected pitcher. The system will convert the tracked movement data into swing data, present the swing on the user interface based on the swing data, and determine a virtual interaction with between a virtual bat representing the bat and the simulated pitch based on the swing data. The user interface can be displayed on a screen of a computer, mobile device, and/or headset.

Some embodiments include a computer-implemented method of virtual reality baseball simulation on a computer. A user uses a bat with a sensing device attached to the bat. Lasers that emit light are positioned in the batting area and are used to determine the positioning of the bat. The method may include presenting the user with a list of baseball pitchers and receiving a selection from the user of a pitcher from the list of pitchers. Further, the method may include presenting, on a virtual reality interface, a simulated pitch from the pitcher which simulates a specific pitcher's pitching speed and curvature. When the user swings the bat with the sensing device attached, the system will receive, from the sensing device, data related to the swing. The data may include bat positioning and speed information gathered using the lasers emitting light and feedback information from the sensing device. Finally, the system may store data from the swing in a computer-readable memory in association with the user's profile. It may also transmit the data to another computer to analyze the data for statistics.

Thus, in some embodiments, a virtual reality baseball system include a wearable electronic device that has a virtual reality display. The system also includes a tracking device with one more sensors that are configured to sense motion and/or position of a bat. The system also includes a processor computer-readable programming instructions that are configured to cause the processor to receive a selection of a pitcher. The system will generate, and cause the virtual reality display to present, a simulated pitch from the selected pitcher. The simulated pitch may have characteristics that correspond to actual characteristics of pitches actually thrown by the selected pitcher. The system will receive motion data from the one or more sensors of the tracking device. The motion data corresponds to a swing of the bat in response to the simulated pitch. The system will then save batting statistics corresponding to the swing to a data store.

The system may include a database that stores pitch characteristics for a various candidate pitchers. To select a pitcher, the system may present at least a subset of the candidate pitchers to a user and receive the selection of the pitcher as one of the presented pitchers. Then, when generating the simulated pitch, the system may use pitch characteristics from the database for the selected pitcher to generate the simulated pitch.

For example, to generate the simulated pitch, the system may determine a batting simulation scenario that includes one or more characteristics of a batter who will use the bat. The system will use one or more of the characteristics of the batting simulation scenario to determine one or more batting simulation parameters. The system will access a database that includes pitch data for the selected pitcher and identify a set of candidate pitches that correspond to the one or more batting simulation parameters. The system will then select one of the candidate pitches as the simulated pitch.

Optionally, when causing the virtual reality display to present the simulated pitch, the system may occlude a first portion of the simulated pitch on the display so that a user of the virtual reality display cannot view the entire simulated pitch. In addition, if the system generates and presents multiple simulated pitches, then when displaying a subsequent simulated pitch the system may occlude the subsequent pitch at level that is greater than that of the previously-occluded pitch.

The system also may include a database of swing data for a user of the bat. The system may generate a user interface that is configured to present the batting statistics and swing data from the database to the user via the user interface.

In some embodiments, the system may include a mounting device that is configured to removably secure the tracking device to the bat. The mounting device may include a first portion with a first recess that is sized and shaped to fit over a portion of a knob of the bat. The mounting device also may include a second portion with a second recess configured that is sized and shaped to fit over a portion of a knob of the bat, as well as a connecting member to secure the first portion to the second portion when the first recess and second recess are each placed over the knob of the bat.

An attachment member may secure the tracking device to the mounting device. In some embodiments, the attachment member may include a threaded member that is positioned to extend away from the knob of the bat in a direction that is parallel to a barrel of the bat. In other embodiments, the attachment member may be a housing formed by the first portion and the second portion of the mounting device when connected together by the connecting member. The one or more sensors may include, for example an accelerometer, gyroscope, and/or inertial measurement unit.

The one or more sensors also may include a photosensor. If so, the system also may include a base station having a laser emitter. The tracking device may be configured to determine a position of the tracking device's photosensor with respect to the base station based on detection by the photosensor of a laser emitted by the base station. Alternatively, the base station may include an infrared (IR) camera, and the tracking device may include one or more passive retroflective IR markers or active IR markers.

It is to be understood that both the foregoing general description and the following detailed description are examples and explanatory, and are intended to provide further explanation of the invention as claimed.

DETAILED DESCRIPTION

Figure 1:
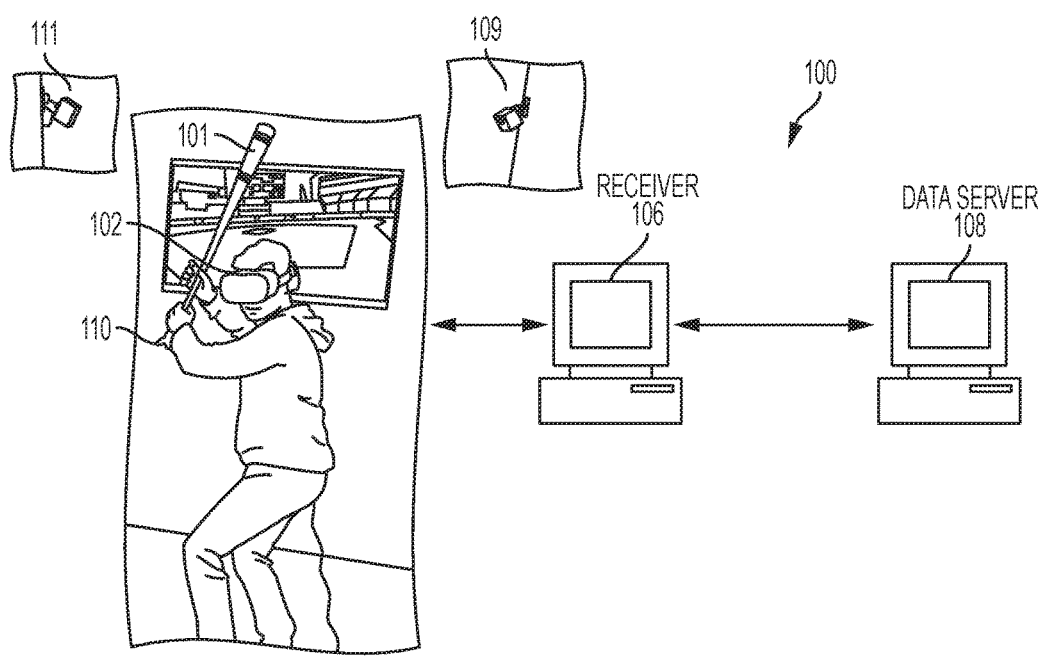
FIG. 1 illustrates various components of an example virtual reality baseball simulation system.

Reference will now be made to the embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Terminology that is relevant to this disclosure includes:

An "electronic device," computer or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, wearable virtual display devices such as virtual reality headsets, media players and the like. In a client-server arrangement, the client device and the server are electronic devices, in which the server contains instructions and/or data that an application of the client device accesses via one or more communications links in one or more communications networks In a virtual machine arrangement, a server may be an electronic device, and each virtual machine or container may also be considered to be an electronic device. In the discussion below, a client device, server device, virtual machine or container may be referred to simply as a "device" for brevity.

In this document, the terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document, the terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the singular forms "a," "an," and "the" include plural references unless the context clearly dictates otherwise. In this document, the term "comprising" means "including, but not limited to."

In this document, the term "virtual reality," when used with reference to an electronic device or method of using an electronic device, refers to the presentation of content so that the user of the device experiences sensory stimuli (such as sights and sounds) provided by the electronic device, and in which the user's actions at least partially determine what happens in the environment. A virtual reality device includes a display, optionally in a wearable headset that positions the display directly in front of the user's eyes, to provide the user with a realistic simulation of a three-dimensional, up to 360-degree environment. In this document the term "virtual reality" includes devices that provide immersive environments in which the computer-generated and displayed content is the entirety of what the user sees, as well as devices that provide augmented reality and/or mixed reality environments in which the user is able to see at least part of the real-world environment with virtual content overlaid on top of the real-world environment. In this document, the term "virtual reality" may sometimes be abbreviated as "VR".

In this document, the term "baseball" is intended to include any team sport in which a batter swings a bat at a ball, including but not limited to baseball, softball and cricket. Similarly, terms relevant to the game of baseball are intended to include their corresponding terms in such other sports. For example, a "pitch" is intended to encompass the action of a bowler propelling a ball toward a batsman in cricket, and a "pitcher" is intended to include not only a pitcher in baseball or softball, but also a bowler in the sport of cricket.

Unless defined otherwise, all technical and scientific terms used in this document have the same meanings as commonly understood by one of ordinary skill in the art.

FIG. 1 illustrates components of an example system 100, including a batter holding a baseball, virtual bat 101, a wearable virtual reality display device 102, a receiver electronic device 106, and a data server 108 that is remotely communicatively connected to the receive via a network. The virtual reality components of the system may include wearable VR display device 102 such as a pair of virtual reality glasses, one or more external optic sensors 109 such as cameras and/or radio frequency identification (RFID) sensor, one or more lasers 111, and a tracking device 110 mounted on the bat 101. The mounted tracking device 107 may communicate with the receiver 106 via wired or wireless communication to provide feedback of the baseball simulator. The optic sensors 109 may be used to sense the motion of the player.

The tracking device 110 may be secured (e.g., removably attached) to the bat 101 (e.g., at the end of the bat 101), preferably in a manner that it is not intrusive to swinging the bat or the weight of the bat. Several configurations of a tracking device are illustrated in the figures, though it is intended that other configurations may be utilized that offer the functionality described herein.

The tracking device 110 includes a transmitter and transmits sensed data to the receiver 106. The receiver 106 is a computing device configured to transmit information, process data, receive inputs, display data on the screen, and display information on the virtual display device 102. Receiver 106 may be any user device such as a laptop, server, tablet, cellphone, etc. As illustrated, the virtual reality interface may also be replicated on a secondary monitor (not shown). The graphical user interface on the secondary monitor may replicate the swing in real time along with the pitches for viewing by an observer, such as a coach or trainer.

The lasers 111 and optic sensor 109 also may include transmitters that are capable of transmitting sensed data to the receiver 106, either directly or via the tracking device 110. For example, optic sensors may include a camera positioned to capture still and/or video images of the batter's body mechanics and/or placement of the bat when the batter uses the system to swing a bat. The camera may include a transmitter to transmit its captured images to the local or remote server, or to other components of the system.

Receiver 106 may accumulate a batter's data and communicate with data server 108 to store, organize, and analyze the accumulated data. Data server 108 may similarly communicate back with receiver 106 and transmit information such as batting statistics or pitcher information. Information that may be transmitted to receiver 106 and/or server 108 may include maximum ball distance, maximum ball height, power, angle of impact, time of impact, heatmap, batting average, at bats/single, at bats/double, at bats/home runs, walks/strikeouts, groundouts/flyouts, hits, home runs, and strikeouts.

The server 108, which for example may be a desktop tower with a receiver, can be configured to receive data transmitted by the other devices, process the data and present the virtual reality simulation on a display and to be viewed in the headset. An operator application installed on a mobile device (e.g., a tablet computer or mobile phone) can adjust configurations and parameters as well as monitor data acquisition from the sensors. An analytics application can present a dashboard on a computing device (e.g., a mobile phone or a personal computer) to present statistics associated with swinging the bat in the simulation against one or more pitchers, pitch types, and pitches.

The server 108 may be located in the batter's environment, and it may communicate with the other devices via a Wi-Fi network, via near field and short range communication protocols such as Bluetooth and its variants, and/or other wireless communication protocols. In some embodiments, a cloud-based server may serve the virtual content to a remotely-located virtual reality system, and it may receive data from the system's sensors, via a wireless communication system. In a remote system, the system may present simulated pitches to the batter on a transactional basis, in which the user purchases one or more simulated pitches from the remote service in one or more transactions.

Figure 11:
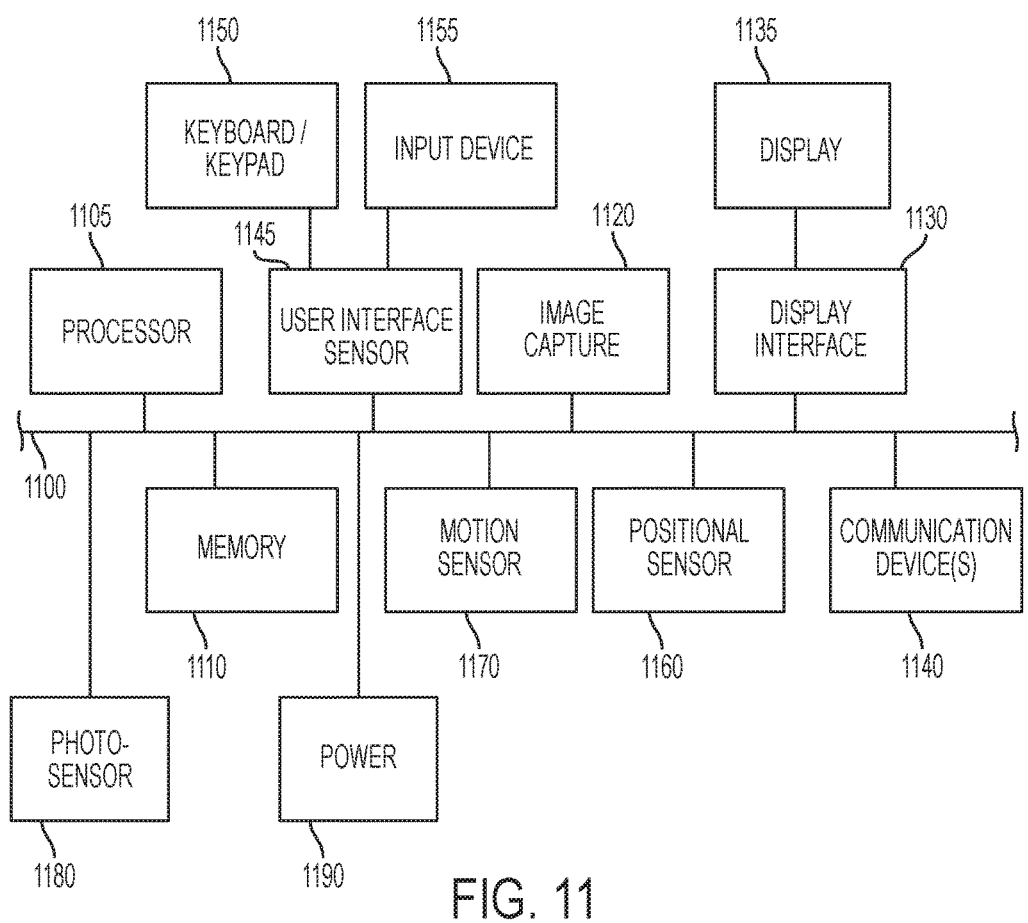
FIG. 11 depicts a block diagram of hardware components that may be used to contain or implement program instructions.

As noted in FIG. 1, the system will include a tracking device 110 configured to mount on a baseball bat. Referring to FIG. 11, electrical components of the tracking device (and other electrical devices of the system) may include a microcontroller or other processor 1105. It also may include one or more sensors, such as a photosensor 1180, a position sensor 1160, and/or a motion sensor 1170 such as a gyroscope, accelerometer and/or inertial measurement unit (IMU).

The tracking device may be that of a commercially available device such as an HTC™ Vive Tracker, although it is intended that any position sensing and/or motion sensing device can be used that is consistent with this disclosure. Additional position and/or motion sensors may be included in a VR headset (e.g., a head-mounted unit that includes a stereoscopic display and motion tracking sensors). The tracking device will include a communication device 1140 with a transmitter, such as a Wi-Fi transceiver or a short-range or near-field transceiver (e.g., a Bluetooth transceiver) for communicating with external devices. The tracking device also will include a power source 1190, such as a rechargeable battery or a power port. The tracking device may be mounted on the bat, and, optionally, additional tracking devices may be mounted in various locations within the user's environment to give a scale of the space around the batter.

Referring back to FIG. 1, base stations that emit position-tracking signals, such as multi-axis lasers 111 (e.g., between 6 and 120 times per second) may be positioned at various locations of the environment to track movement of the bat-mounted tracking device and/or other objects in the environment. Such base stations may include commercially available stations such as the Valve Lighthouse and/or other stations that emit tracking signals. The tracking device and/or wearable headset may each include photosensors (1180 in FIG. 11) or other receivers to sense the lasers and determine positioning of the bat or the positioning of the headset. When a receiver detects that a laser beam has contacted it, it may count the time between that event and the next time that the receiver detects a different laser beam (or the next time that a different received detects the same laser beam) to determine the receiver's position relative to the base station 111 that emitted the laser beam.

In other embodiments, the base stations may include an infrared (IR) camera, and the tracking device may include one or more passive retroflective IR markers or active IR markers that can be detected by the IR camera during real-time motion capture.

Method For Calculating High Velocity Swing Path in Virtual Reality: To determine the speed and trajectory of a virtual hit in the simulation, the system may calculate the energy transfer and trajectory of a batted ball in the simulation. To determine energy transfer, the system may determine the exit speed of the (virtual) ball as it leaves the bat is calculated by determining the apparent coefficient of restitution (ACOR, or Q) based on the location at which the ball virtually collides with the bat. This quantity ranges from a first value (e.g., 0) near the tip of the bat to a second value (e.g., around 0.3) near the sweet spot of the bat, and the system may derived it using a best-fit curve from empirical data. Since Q=(ball exit speed/ball incident speed), for striking an object at rest, the formula can be expanded to a ball striking a moving bat as: ball exit speed=(1+Q)*Vbat+Q*Vball. The system also may probabilistically calculate an expected hit type using a nearest neighbor algorithm or any other suitable process.

To determine the ball's trajectory, the system may compare the x, y landing coordinates of the ball with data that is available for actual hits that happened to the simulated pitch (as stored in a database). Given a pitch's initial velocity and spin rate/spin direction, the system may simulate a forward path for the ball by calculating the lift (Fl), drag (Fd), and gravitational forces on the ball at a given point in time and adding them together to solve for the acceleration vector, which can then be used to solve for velocity and position, using algorithms such as:

$Fl=0.5*AirDensity*LiftCoefficient*CrossSectionalArea*V^2$ $Fd=0.5*AirDensity*DragCoefficient*CrossSectionalArea*V^2$ LiftCoefficient is a function of the
SpinFactor=Vrotational/Vtotal, and may be
approximated by $Cl=0.10507*\log(SpinFactor)+0.3928$ DragCoefficient is a function of Mass and AirPressure, and can be approximated as 0.3 for a baseball at normal elevation. AirDensity is constant for a given temperature/air pressure/humidity, and is calculated using the Ideal Gas Law and Dalton's Law of Partial Pressures.

Then, for a given time t, the system may determine the ball's instantaneous acceleration vector (Aball), so the same formula can be applied to find the acceleration some time in the future t+n, which may be used to forward simulate the ball's velocity (Vball) and (Pball) position to the same timestep t+n:

$A\text{ball}(t+n)=A\text{gravity}+(Fl/M\text{ball})+(Fd/M\text{ball})$ $V\text{ball}(t+n)=V\text{ball}(t)+A\text{ball}(t+n)*n$ $P\text{ball}(t+n)=P\text{ball}(t)+V\text{ball}(t+n)*n.$ The system may extrapolate the bat's position to an update rate much higher (for example, >5000 Hz) than the sensor external update rate (<=120 Hz) by using a weighted moving average (WMA) of the last N recorded values of velocity, and assuming this velocity is constant for all extrapolated samples. For a given recorded sample of the bat's position/rotation (Pball/Rball) from external sensors at time t, the system may calculate a weighted average of velocity/angular velocity (Vball/AVball) using a weighted moving average, and then use that information to determine extrapolated position/rotation samples at time t+n, where n is less than or equal to the sensor update period.

Figure 2A:
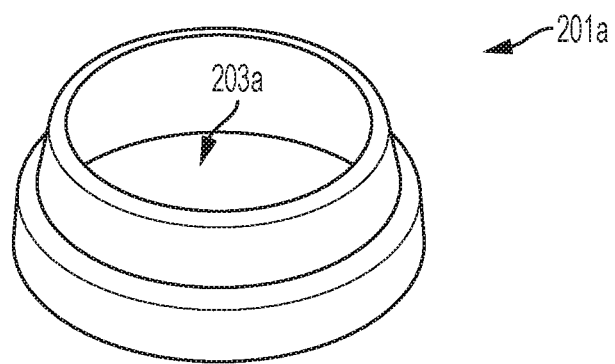
FIGS. 2A and 2B illustrate a ring for a mounting component for mounting a tracking device to the knob of a baseball bat.
Figure 2B:
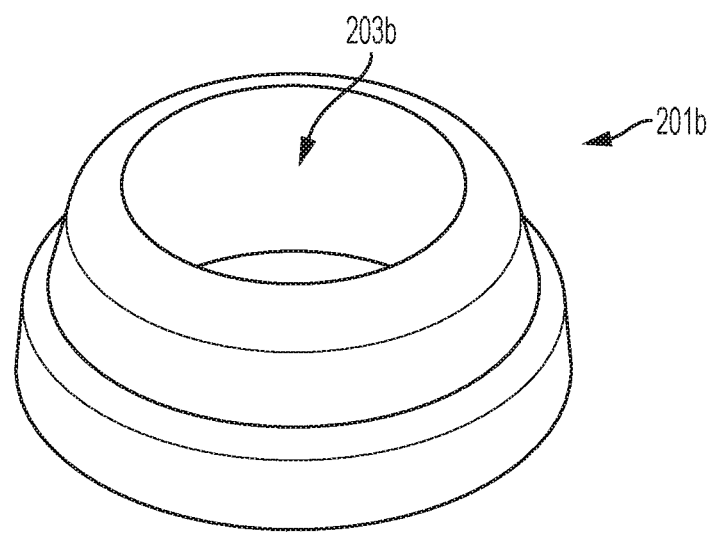

The same may be done to extrapolate the bat's rotation by using angular velocity:

$P\text{bat}(t+n)=P\text{bat}(t)+V\text{bat}(t+n)*n$ $R\text{bat}(t+n)=R\text{bat}(t)+AV\text{bat}(t+n)*n.$ FIGS. 2A and 2B illustrate example embodiments of a ring 201*a*, 201*b* that is part of a mounting component for mounting a tracking device to a bat. The ring is configured to be positioned over a knob of the bat. In each illustrated embodiment, the ring is illustrated as a full ring, but the ring can be configured as two portions (e.g., halves of the ring) that can be joined as a full ring once in position over the knob of the bat. FIG. 2A illustrates a configuration with a larger aperture 203*a* for receiving the bat than the aperture 203*b* of the configuration illustrated in FIG. 2B, such that the ring in FIG. 2B may be used for mounting the tracking device to a bat having a smaller diameter or knob.

Figure 3A:
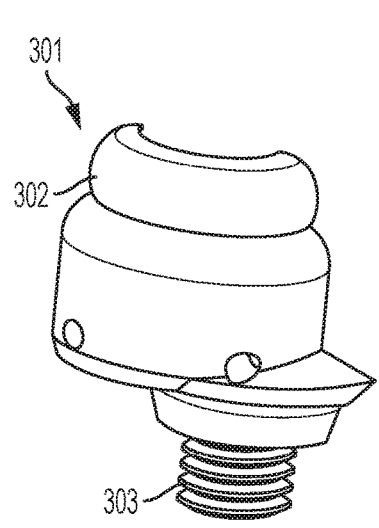
FIGS. 3A-3C illustrate a mounting component segment for mounting a tracking device to a bat.
Figure 3B:
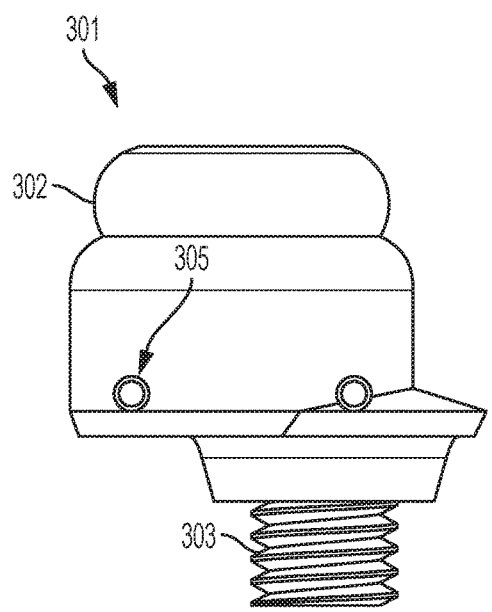
Figure 3C:
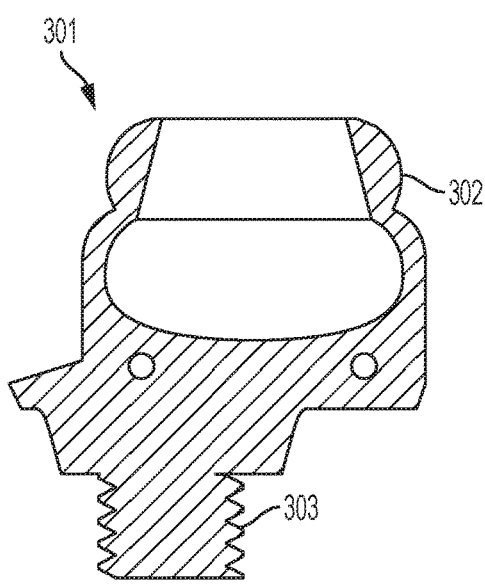

The ring, such as those shown in FIGS. 2A and 2B, may be coupled to another mounting component segment illustrated in FIGS. 3A to 3C. FIG. 3A is a perspective view of the mounting component 301. FIG. 3B is a side view, and FIG. 3C is a cross-sectional view. A first end of the mounting component 301 has the ring 302, and a second (and opposite) end of the mounting component 301 has a threaded member 303 for receiving the tracking device. The mounting component 301 can be configured such that separate parts can be coupled once the mounting component 301 is positioned on the bat. In this example, the mounting component may have a first half or other section and a second half or other section, and these halves can be secured together using a securing device such as screws, pins or an E-Z Lock-type press insert 305.

Figure 4A:
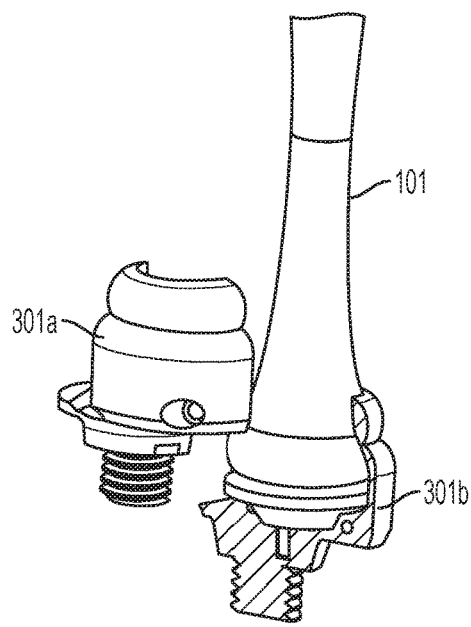
FIGS. 4A and 4B illustrate an example of a mounting component and tracking device mounted to a bat.
Figure 4B:
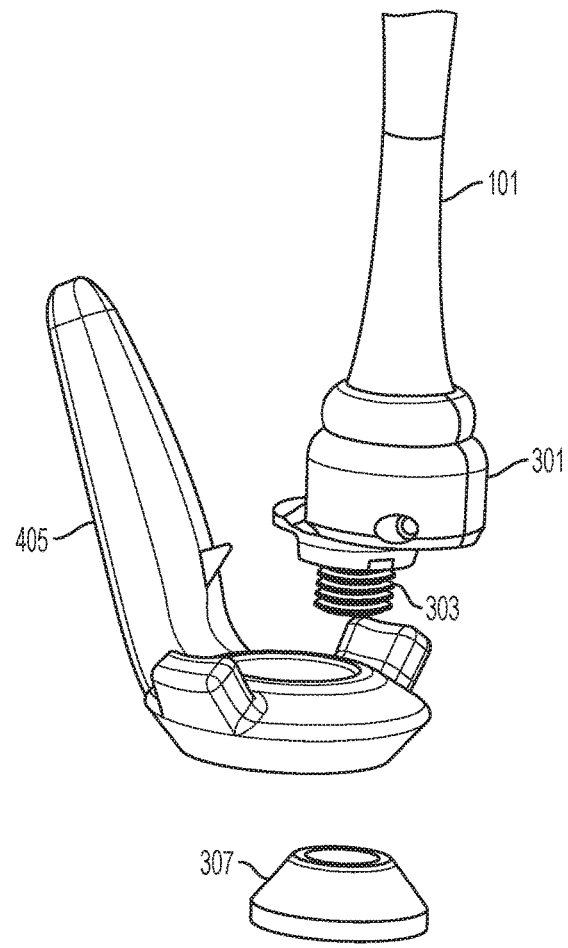

FIG. 4A shows how two halves of the mounting component 301*a*, 301*b* may be connected to the bat 101. FIG. 4B shows the mounting component 301 on the bat 101. When mounted, the threaded member extends away from the knob of the bat 101 in a direction substantially parallel to the barrel of the bat 101. A sensor is configured in a circular housing of a tracking device 405. The threaded member 303 can extend into the tracking device 405. A receiving mount member 307 is configured to engage with the threaded member 301 as a nut engages a screw. As a result, the mounting component 301 can be secured to a bat 101 and then secure the tracking device 405 in place. It is understood that this disclosure is not limited to the specific structures depicted in this figure.

Figure 5A:
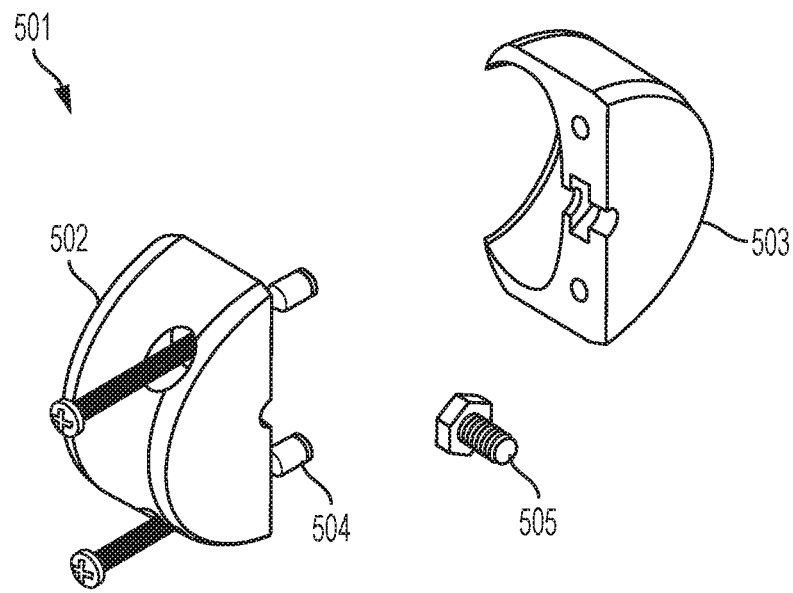
FIGS. 5A and 5B illustrate an alternate mounting component.
Figure 5B:
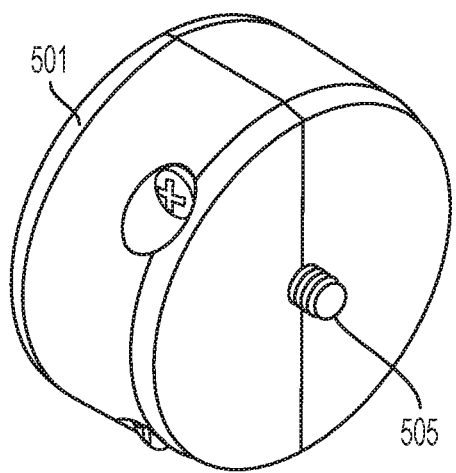

FIGS. 5A and 5B illustrate an alternate mounting component 501 for securing a bat to a tracker. In this embodiment, the mounting component 501, which may secure the tracking device to the bat, has a cylindrical shape configured to engage a knob of a bat. A first portion 502 has a recess for the knob, and a second portion 503 has a recess for the knob. The first portion 502 and the second portion 503 are coupled to each other around the knob. The first and second portions can be attached, for example, using screws 505. On a flat side of the mounting component facing away from the bat, a threaded member 506 extends away from the mounting component and is configured to mate with a controller. When mounted, the threaded member 506 extends away from the knob of the bat in a direction substantially parallel to the barrel of the bat.

Example configurations for attaching a tracker or other virtual reality sensor or controller to a bat are described in this document, though it is intended that any component can be used and attached in any appropriate manner. It is desirable, however, to attach the component to a bat in a manner that it does not impede with the batter's swinging of the bat and does not substantially impact the weight of the bat. Using the configurations described in this document, a batter can use an actual baseball bat and attach the appropriate component to the bat to enable it for the virtual reality system. Thus, a standard bat may be used and a specially designed bat is not necessarily required. In one example, the component may take the form factor of a weighted ring or baseball bat doughnut. In another example, the component may be embedded within a bat. In yet another example, the component may be clamped, screwed, elastically screwed or otherwise attached to the bat, such as the knob or barrel of the bat. In some embodiments the threaded member (303 in FIG. 3) may be replaced with any connecting member, such as a pin, clip or other fastener.

In other embodiments, instead of connecting a separate tracking device to mounting components, the mounting components themselves may contain the electronic components of a tracking device, such as the accelerometer and/or gyroscope. Some of the components that a mounting device or connected tracking device may mount would include any or all of the following: an inertial sensor; one or more photoresistors; Bluetooth or other near-field or short range communication devices; a battery such as a lithium ion battery; and/or a microcontroller. Such mounting devices may take the form of those shown in FIGS. 4A through 5B without additional mounting members for receiving a tracking device, and/or other forms. In such cases, the mounting device housing may provide the function of the attachment member for the sensors and/or other components. Other mounting configurations include placement of the mounting device at the base of the bat (knob), end of the bat (barrel), or the mid-area of the bat (handle). Other mounting mechanisms that the system may employ include a vice/clamping mechanism, an elastic mechanism, a customized bat with integrated sensors, a mounting interface mated with bat, or a screw mount embedded in the bat.

Additional bat mounts and attachments may be contemplated within the scope of embodiments described herein. Several configurations may be considered including locking units that can be attached (e.g., affixed, coupled, screwed, locked, adjoined) to each other. Optionally, the device can be removably attached so that the same bat can be used both for a virtual reality simulation and an actual baseball game.

As shown in the example embodiments, two or more components, at least one of which contains a sensor, can be adjoined on the bat and attached. Other configurations of the sensors may be used to couple the sensor to an actual bat. In another embodiment, a hollow-centered spherical/circular-shaped sensor may be attached to the middle or a higher point of the bat. This circular shaped attachment may be flexible and attach by entering from the butt end of the bat and fitting on the barrel of the bat as it moves along the bat. In yet another embodiment, a bat may be constructed with the sensors integrated or installed inside of the bat. In any of these embodiments, the tracking device and/or sensors may be positioned over the knob, on the barrel near the knob (i.e., at the handle), or at other locations such as a midpoint of the bat's barrel.

Some surface bat mounts may include trackers that enable tracking and transmission of specific data. In some embodiments, the trackers may pair with a wireless dongle or use USB (or other types of) data transfer interfaces in order to transfer the tracking data to a computer. In one embodiment, the tracker may track passive objects with a USB (or other) cable passing data directly. In another embodiment, the tracker may use an accessory to communicate with the computer and pass data. In another embodiment, the tracker may pass the data via a wireless interface to the computer. In yet another embodiment, the tracker may track the bat with a wireless interface and an accessory mat transfers data further by a general purpose input/output pin.

Figure 6:
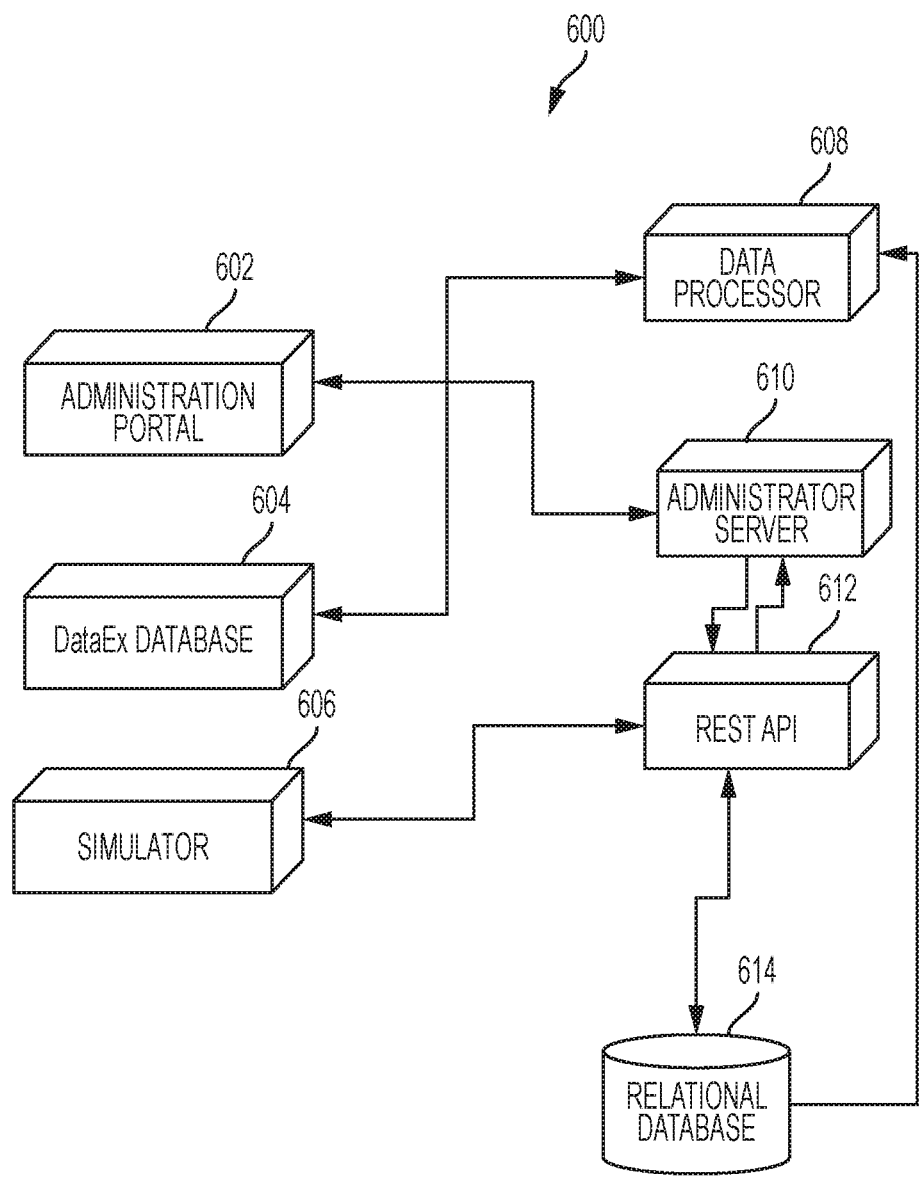
FIG. 6 illustrates components of an example system for measuring data from a simulation.

FIG. 6 is a block diagram that illustrates an example simulations system 600, with components for measuring data generated during a simulation. Simulations system 600 may include an administration portal 602, database 604, and simulator 606. The administration portal may be generated by a processor implementing computer-readable instructions to output a user interface by which a user may operate and/or adjust various parameters of the simulations system. The simulator may generate the simulation and cause the simulation to be presented in a headset or a computing device such as receiver (106 in FIG. 1). Similarly, simulations systems 600 may include data processor 608, administrator server 610, rest API (Application Programming Interface) 612, and relational database 614 on a server such as data server (108 in FIG. 1).

Simulator 606 may include a user interface that presents a virtual baseball game or batting practice such that it appears to the batter that he or she is present in that virtual environment. Simulator 606 may interact with rest API 612 to queue and query information about the user as well as information that the simulations system 600 has learned. Rest API 612 may query the relational database 614 for information associated with the user's preferences, pitcher characteristics, and/or information the system has learned from his/her previous batting experiences.

Database 604 and/or relational database 614 also will include data about various pitchers, characteristics of pitches actually thrown by those pitchers, and associations of those pitches to batting scenarios. Characteristics of individual pitches may include pitch type (fastball, breaking ball, curveball, knuckleball, changeup, etc.), pitch speed, position in the strike zone at which the pitch crosses the plate, and the like. Batting scenarios may include characteristics of the batter and/or the time at which the pitch was thrown. Examples of batting scenario characteristics include handedness of the batter, pitch count (balls/strikes), number of outs, height of the batter, and/or data about the batter's previous hits or misses of prior pitch types.

Database 604 may include data about the pitches presented to the batter in a simulation, as well as data collected by (or generated from) the bat-mounted tracking device about the batter's swings in response to the pitches. Example data may include the maximum ball distance of the hit, the maximum ball height, the power of the hit, the angle of impact, the time of impact, a heatmap showing locations of pitchers in a strike zone or hit balls in an environment, the batting average of each player, the number of at bats/single, at bats/double, at bats/home runs, the number of walks/strikeouts per player, the number of groundouts/flyout, the number of hits, the number of home runs, and the number of strikeouts stored for the user. DataEx database 604 may communicate with data processor 608 for storing and retrieving information for the user's simulation. When the system operates a simulation, the data collected from the sensors may be stored in the database 604, optionally after being processed to generate any of the statistics described above, or other statistics.

Administration portal 602 may include a user interface or a backend processor that is configured by the user. Similarly, administration portal 602 may include settings set up by an administrator on an administrator server 610, such as the data server 108 shown in FIG. 1. Administration portal 602 may communicate with administrator server 610 via a network protocol such as Internet Protocol (IP), Wi-Fi or Long Term Evolution (LTE).

A data processor 608 may communicate with relational database 614 and thereafter update DataEx database 604. Administrator server 610 may manage all the batter's information and configurations in a centralized system. Administrator server 610 may communicate with the client device receiver (106 in FIG. 1) for outputting statistics and information to the user, as well as configuring the simulator as he/she requests. Administrator server 610 may similarly communicate with rest API 612 for updating the relational database 614 and any other communication that may be needed between devices.

Figure 7:
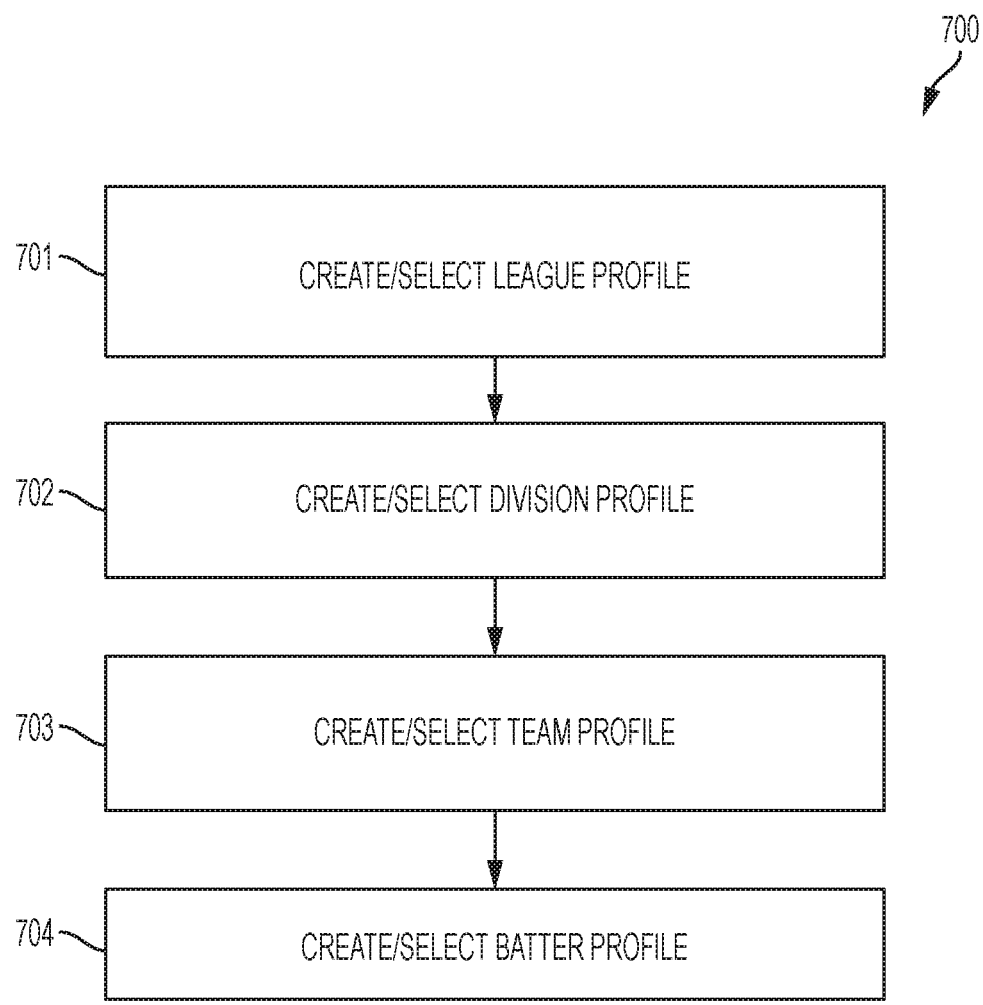
FIG. 7 illustrates an example process flow for operating a simulation.

FIG. 7 illustrates an example administration flow 700 for selecting and configuring the system. For example, a user (e.g., batter or coach) may execute the administration application and input in the batter's name, height, weight, etc. Then, the user may select a pitcher for the game. Identifying data for available pitchers, and characteristics of their pitches, will be stored in a database such as one that is stored in the data server(s) 108 of FIG. 1. For example, the user may select a real pitcher who has actually played, or even a pitcher that the batter will be facing in an upcoming game, so long as the system stores data about the pitcher's pitch characteristics. The system stores and maintains pitcher pitching data including characteristics of the pitcher's pitches, methods, forms, and nuances. As a result, the system can present a realistic simulation of a specific person/pitcher and allow the batter to practice against the simulated pitcher.

Referring back to FIG. 6, in some embodiments, a user may create a profile using a user interface on simulator 606. Simulator 606 may present the user with options which it accesses via rest API 612. Rest API may read and write profile data on relational database 614 as well as communicate with administrator server 610. Simulator 606 may present the interface on a virtual reality headset of a computing device monitor or screen. Relational database may also communicate with data processor 608, which may compute and analyze different user's profiles and information for comparison and statistics. Administrator server 610 may present a user interface that allows users to configure their profiles and settings via administration portal 602.

The database 704 may be stored on a server or local on the user's computing device. The database 704 may communicate with data processor to receive comparable batting statistics for a specific pitcher or in relation to other users of the system.

In administration flow 700 of FIG. 7, the user may create and select a league profile 701. For example, the user may be able to select a team from a certain year or choose different players on an opposing team. Similarly, the user may specify division 702, team 703, and batter 704 information for each game or season. The system can track the user's performance over time against different players/pitchers. Additionally, the system can simulate and track different weather conditions and types of baseball fields or stadiums.

Referring back to FIG. 6, the system can present numerous options on the user interface for the user to select to adjust the simulation to reflect an upcoming game or condition. The user may be able to create a division profile using simulator 606 and/or administration portal 602. The user can select different teams and assign players to different teams. The user may also be able to define or select the team profiles via simulator 606 and/or administration portal 602. Batter profiles may similarly be created or selected via simulator 606 and/or administration portal 602. Batter profiles may include batting statistics such as time of impact, heatmaps, at bat analysis, batting average, at bats/single, at bats/double, at bats/home runs, predictive on base percentage (OBP), predictive slugging percentage (SLG), walks/strikeouts, groundout/flyout, hits, home runs, and strikeouts. These statistics may be stored on a per pitcher basis for each user.

Figure 8:
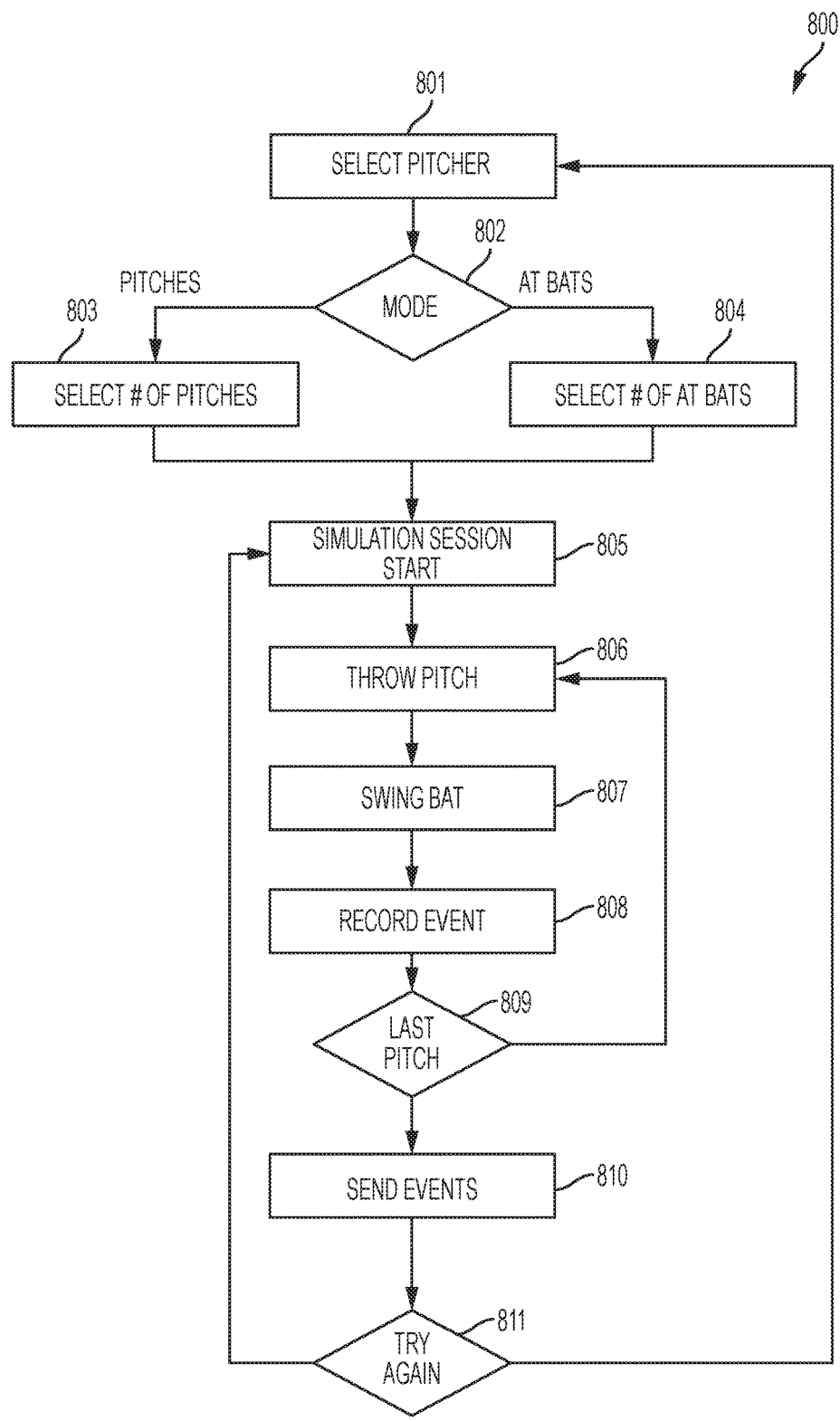
FIG. 8 illustrates an example simulation loop.

FIG. 8 illustrates an example simulation loop 800, which is a process by which the system may implement a pitching process flow using a pitching rules engine. The system's user interface may receive a user selection of a pitcher from one or more candidate pitchers 801. The system may present the pitcher for selection from a lineup of a set of pitchers, or the interface may present a query field to allow for searching for a particular pitcher. Once the user selects a pitcher (step 801), in a mode selection step (802) the system may select a default mode and/or the interface may present options for a mode to select. In one mode, the user may select the number of bats to attempt with that pitcher, and the system may receive that selection (step 803). In another mode, the user may select the number of pitches for the simulation and the system may receive that selection (step 804). Once this data is input, the simulation can begin (step 805).

After starting the simulation, the simulation screen (in the headset or other wearable device and/or the monitor) selects a pitch according to that pitcher's attributes and displays the selected pitcher throwing the pitch (step 806). When generating and presenting a pitch (step 806), the system may apply pitch rules engine that includes programming instructions and associated hardware (e.g., a processor and user interface such as a microphone, touch screen or keyboard). The pitch rules engine receives input from the user and data from the server. The pitch rules stored in the database in association with a selected pitcher, or they may be a general set of rules (i.e., algorithms) that use variables that are stored in the database in association with the selected pitcher. Alternatively, a pitcher may be customized by the user through the user interface or administration panel, and the rules and/or variables may be defined by the user.

To select a pitch, the system may identify a batting simulation scenario with parameters pursuant to which the pitch will be thrown. These parameters may include, as previously described above, parameters such as batter handedness, number of outs, position in the pitch count and the like. The batting simulation scenario also may include an identity of the selected pitcher, pitch speed boundaries (min/max), select pitch, number of pitches to render in the simulation. Any of these parameters may be entered by the user, randomly generated, or automatically selected using one or more rules.

The system will then generate and render a pitch that corresponds to the batting simulation scenario. For example, the system may access the database of pitcher data and select one or more of the pitcher's pitches that correspond to the simulation parameters, retaining only pitches that meet the batter handedness criteria and other parameters of the batter in the simulation scenario, along with (if selected) the speed boundaries criteria, and pitch type criteria. The system will then emulate the pitcher behavior by selecting one of the retained pitches that satisfy the criteria. If multiple candidate pitches are available, the system may randomly select a pitch from the candidate pitches, optionally using a weighted randomization function that more highly weights pitches that the pitcher statistics indicate have a higher probability of being thrown.

The system may use the rules to generate a pitch type such as fastball, breaking ball, changeup, or curveball, optionally randomly and/or as a function of the pitcher's characteristics based on the simulation scenario and the pitcher data. For example, if a selected pitcher's data indicates that the pitcher selects a breaking ball at a particular point in the pitch count at a determined percentage of the time, the pitching rules may generate breaking balls for at least the same (or within a tolerance range such s +/− ten percent from) that percentage on pitches that are associated with that count. The rules engine also may include data indicating the pitcher's typical average speed or range of speeds—or location in the strike zone when crossing the plate—for various types of pitches in various types of situations, and it may cause the pitch to be within a threshold of the average or within the range when those situations occur. Example factors that may be considered part of the situations include point in the count, previous pitch(es) thrown to the batter, ball/strike count, or the like.

Such rules and variables may be part of a pitch model that the system will use to generate the pitch. The pitch rules engine may thus use a pitch modeling process to generate a pitch. The system may store, for each pitcher, data representing an actual set of pitches from a previous pitch sequence of the pitcher. The system may present the pitches to the batter in random mode, randomly selecting any of the pitcher's stored pitches. Optionally the system may use an algorithm that randomly selects pitches but also weights the selection based on the pitcher's actual probability of presenting a particular category of pitch (fastball, curve, slider, etc.). Alternatively, the system may present pitches to a batter in pitch sequence mode, in which the pitches follow an actual stored sequence of pitches that the pitcher presented to a batter in a real life situation.

The system may also present pitch recognition exercises in which the system may provide a user interface by which the user may identify the type of pitch to the system. This may include a microphone into which the user speaks to identify the pitch as a ball or strike, or a user interface (such as touch-sensitive switches) on the bat. In this situation the goal is not necessarily to hit the ball, but instead it is to identify the type of pitch. The system may compare the batter's input with the actual pitch data for the presented pitch to provide the batter with feedback as to whether or how often the batter correctly identified the pitch.

Optionally, when generating and presenting a pitch (step 806) the pitch exercises system may implement an occlusion-based pitch recognition exercise in which the VR display device occludes part of the ball being pitched to see if the batter can correctly identify the pitch despite it being occluded by 25%, 50%, 75% or another percentage. Optionally, the system may increase the level of occlusion as subsequent pitches are presented to make the exercise progressively more difficult. The system also may adjust the speed of the pitch, presenting it at varying speeds to help the user start at a slower-than-reality and work up to more difficult exercises at real-life speeds or greater.

The system may store pitch recognition metrics in a batter's profile to provide the batter with visual or audio statistics showing the batter's pitch recognition performance in a session and/or over time.

Once the pitch is thrown, the user may attempt to swing the bat. When the user swings the bat, the event (i.e., characteristics of the user action as sensed by the system sensors) may be tracked and recorded by the system based on the various sensors discussed above in the context of FIG. 1 (step 807). In another scenario, the user may choose to not swing the bat, and the system will still track and record the event in step 807. Recording of the event (step 808) may include collecting data and/or initiation of a swing rules engine that determines a type and/or characteristics of the swing. Examples of data that may be collected include maximum ball distance, maximum ball height, time of impact, angle of impact, swing speed, and type and subtype of swing.

The simulation may continue to present a pitch by the pitcher until the system determines that the last pitch has been presented (step 809). The simulation may continue to present pitches until an indicator identifies the last pitch. In one embodiment, the simulation may present using a pitch count, such that the pitches continue until there are four balls or three strikes. Once the simulation presents the last pitch, the simulator may transmit the recorded events to the database locally and/or the server (step 810). Alternatively, the simulator may transmit the recorded events as the events proceed or in a batch format.

After the simulator transmits the events, the simulator determines if the simulator should begin again with a new batter, a new pitcher, or a different configuration (step 811). To determine whether to try again (step 811), he system may prompt a user with a query of whether to restart a simulation with the selected pitcher. If the user selects to not restart, the simulator can present other options for pitchers or allow the user to change other parameters.

Figure 9:
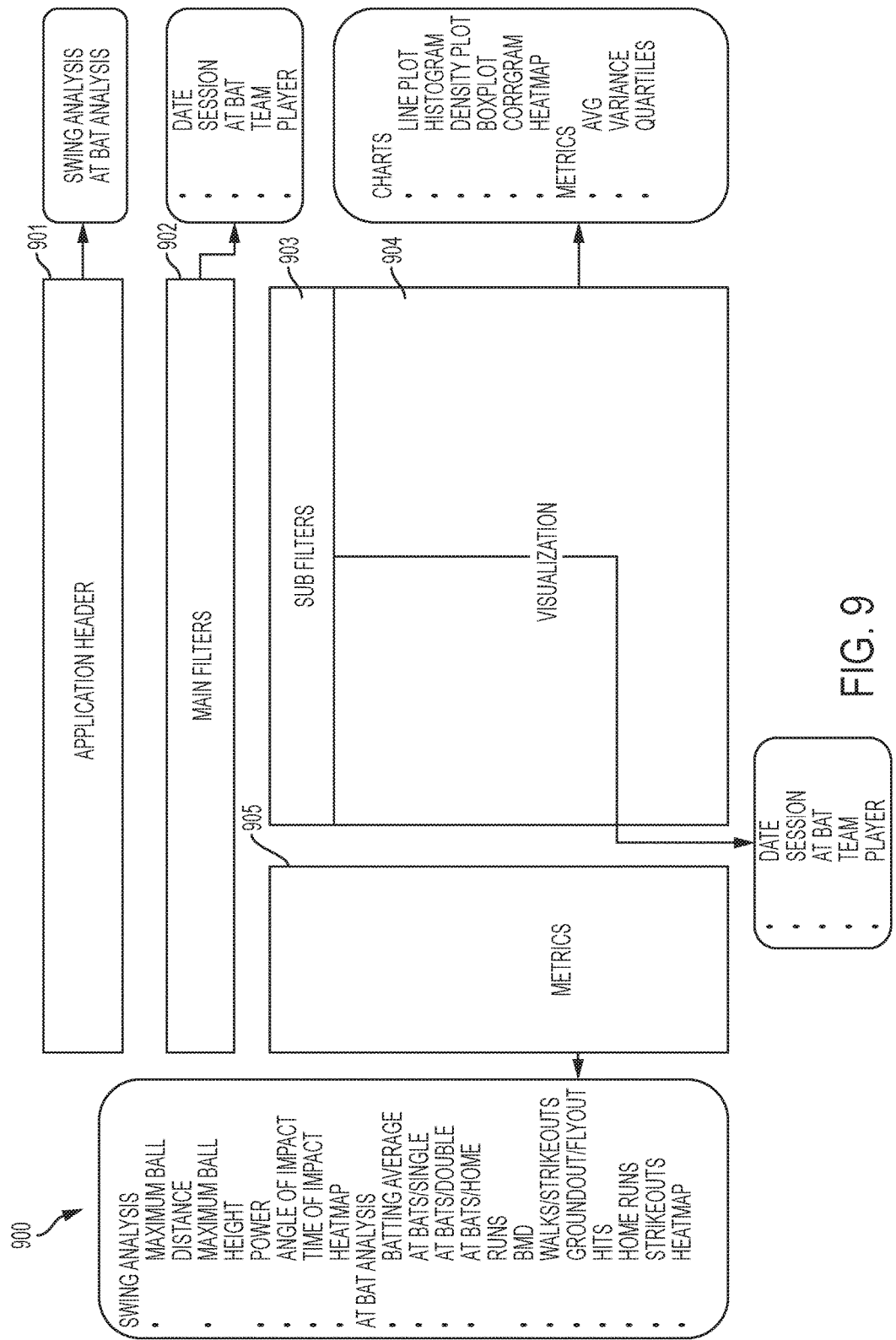
FIG. 9 illustrates an example application layout.

FIG. 9 illustrates an example application layout 900. An example application layout may be an interface on a screen. Any variation of components of the application layout may be used. In some instances, the application layout may include an application header 901, metrics 905, filters 902 and/or sub-filters 903. The application header 901 may include such information as swing or at-bat analysis. Filters 902 may include date, session, at-bats, teams, and/or players. Sub-filters 903 may include date, session, at bats, team, and/or player. Any of these selected data points may become variables that the system uses in its pitch rules engine when generating a pitch. Visualizations 904 are individual or groups of metrics for the user in a current at-bat or one or more previous at-bats presented in charts or other format. For example, visualizations may include line plots, histograms, density plots, boxplots, correlograms (which may be implemented through a corrgram function), and heatmaps. Metrics may include averages, variances, quartiles and/or other groupings. Metrics may include such things as maximum ball distance, maximum ball height, power, angle of impact, time of impact, heatmaps, at bat analysis, batting average, at bats/single, at bats/double, at bats/home runs, walks/strikeouts, groundout/flyout, hits, home runs, strikeouts, and heatmaps.

Figure 10:
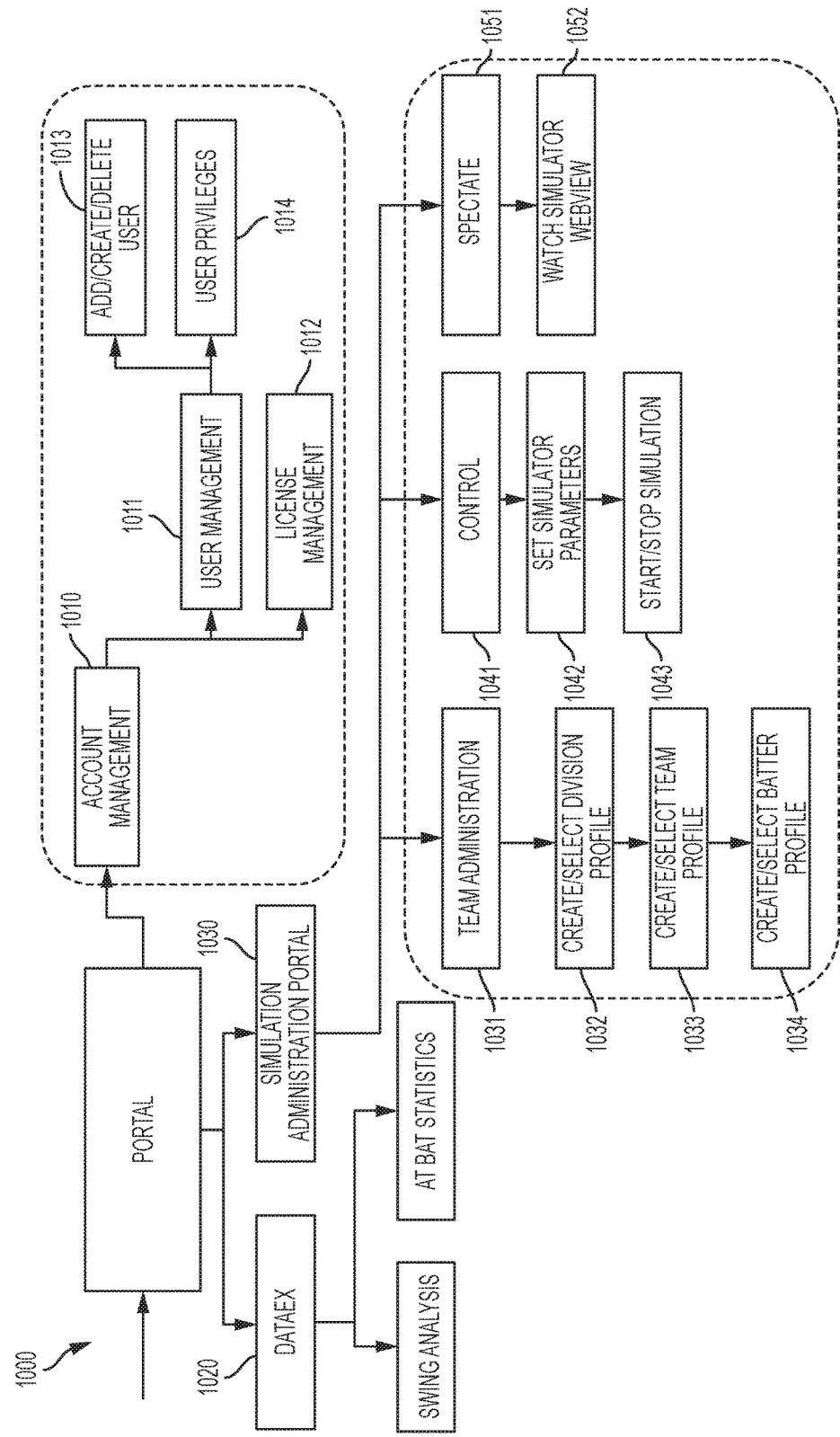
FIG. 10 illustrates an interface flow diagram.

FIG. 10 illustrates a flow diagram indicating various actions 1000 that the user may initiate via a user interface. For example, a user entering the user interface portal 1001 presented on a computing device may proceed to account management 1010, a simulation administration portal 1030 or a connection to the DataEx database 1020. The DataEx connection 1020 may initiate a process by which the system will present swing analysis 1021 and/or at-bat statistics 1022 via a user interface for the user. In account management 1010, the user may manage licenses 1013 and/or users 1011. The user may purchase or verify license information through license management 1013. Similarly, the system may enable the user to add/create/delete a user profile 1013 or set/verify user privileges 1014 in the account management portal. In the simulation administration portal 1030, the user may perform team administration 1031 such as by creating and/or selecting a division profile 1032, team profile and/or batter profile 1033.

In the simulation administration portal 1030, the user may also perform manage control 1041, and/or spectate 1041 by simply watching a simulation 1042 on a display.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

FIG. 11 depicts a block diagram of hardware components that may be used to contain or implement program instructions to execute the functions described above, such as components of a wearable electronic device such as a VR headset, a cloud-based server, a virtual machine, or a container. A bus 1100 serves as an information highway interconnecting the other illustrated components of the hardware. The bus may be a physical connection between elements of the system, or a wired or wireless communication system via which various elements of the system share data. Processor 1105 is a processing device of the, performing calculations and logic operations required to execute a program. Processor 1105, alone or in conjunction with one or more of the other elements disclosed in FIG. 12 is an example of a processing device, computing device or processor as such terms are used within this disclosure. The processing device may be a physical processing device, a virtual device contained within another processing device, or a container included within a processing device.

A memory device 1110 is a hardware element or segment of a hardware element on which programming instructions, data, or both may be stored. Read only memory (ROM) and random access memory (RAM) constitute examples of memory devices, along with cloud storage services.

A display interface 1135 may permit information to be displayed on the display 1130 in visual, graphic or alpha-numeric format. The display interface 1135 and display 1130 also may include an audio interface and speaker, or the system may include a separate audio interface and audio output such as a speaker, headphone jack, or antenna for communication with a headset, earbud(s) or other audio devices. Communication with external devices, such as a printing device, may occur using various communication devices 1140, such as a communication port or antenna. A communication device 1140 may be communicatively connected to a communication network, such as the Internet or an intranet.

The hardware may also include a user input interface sensor 1145 which allows for receipt of data from input devices such as a keyboard or keypad 850, or other input device 1155 such as a mouse, a touch pad, a touch screen, a remote control, a pointing device, a video input device and/or a microphone. User inputs such as pitcher selection, start and stop commands or other commands and selections may be received by the microphone on operation of the baseball simulation system. Data also may be received from an image capturing device 1120 such as a digital still image camera or video camera. As previously described the device may include a photosensor 1180 configured to detect various wavelengths and/or frequencies of light, such as a laser emitted as described above. A positional sensor 1160 and/or motion sensor 1170 may be included to detect position and movement of the device. Examples of motion sensors 1170 include gyroscopes or accelerometers. Examples of positional sensors 1160 include a global positioning system (GPS) sensor device that receives positional data from an external GPS network. The system also may be connected to a power supply unit 1190.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A virtual reality baseball system comprising:
   a wearable electronic device comprising a virtual reality display;
   a tracking device comprising one more sensors that are configured to sense motion and/or position of a bat;
   a processor; and
   computer-readable programming instructions that are configured to cause the processor to:
   receive a selection of a pitcher,
   access a database that includes pitch data for actual pitches thrown by the selected pitcher and use a weighted randomization function to select a simulated pitch from the pitch data, wherein the weighted randomization function more highly weights pitches that the pitch data indicates that the selected pitcher has a relatively higher probability of being thrown,
   generate, and cause the virtual reality display to present, the simulated pitch from the selected pitcher,
   receive motion data from the one or more sensors of the tracking device, wherein the motion data corresponds to a swing of the bat in response to the simulated pitch, and
   save batting statistics corresponding to the swing to a data store.

2. The system of claim 1, wherein the instructions to select the simulated pitch also comprise instructions to:
   determine a batting simulation scenario that includes one or more characteristics of a batter who will use the bat comprise handedness, pitch count, number of outs, height of the batter, or data about previous hits or misses of prior pitch types by the batter;
   use one or more of the characteristics of the batting simulation scenario to determine one or more batting simulation parameters;
   access the database and identify a set of candidate pitches that correspond to the one or more batting simulation parameters; and
   select one of the candidate pitches as the simulated pitch.

3. The system of claim 1, wherein the instructions to cause the virtual reality display to present the simulated pitch comprise instructions to occlude a first portion of the simulated pitch on the display so that a user of the virtual reality display cannot view the entire simulated pitch.

4. The system of claim 3, further comprising additional instructions that are configured to cause the processor to:
   generate an additional simulated pitch from the selected pitcher; and
   cause the virtual reality display to present the additional pitch on the display while occluding a second portion of the simulated pitch, wherein the second portion is greater than the first portion.

5. The system of claim 2, wherein the one or more characteristics of the batter comprise one or more of the following: handedness; pitch count; number of outs; or data about previous hits or misses of prior pitch types by the batter.

6. The system of claim 1, further comprising:
   a database comprising pitch characteristics for a plurality of pitchers; and
   additional programming instructions that are configured to cause the processor to generate a user interface that is configured to:
   present at least a subset of the plurality of pitchers to a user,
   receive the selection of the pitcher as one of the presented pitchers, and
   when generating the simulated pitch, using pitch characteristics from the database for the selected pitcher to generate the simulated pitch.

7. The system of claim 1, further comprising:
   a database comprising swing data for a user of the bat; and
   additional programming instructions that are configured to cause the processor to generate a user interface that is configured to present the batting statistics and swing data from the database to the user via the user interface.

8. The system of claim 1, further comprising a mounting device that is configured to removably secure the tracking device to the bat, and wherein the mounting device comprises:
   a first portion with a first recess that is sized and shaped to fit over a portion of a knob of the bat;
   a second portion with a second recess configured that is sized and shaped to fit over a portion of a knob of the bat, as well as a connecting member to secure the first portion to the second portion when the first recess and second recess are each placed over the knob of the bat; and
   an attachment member configured to secure the tracking device to the mounting device.

9. The system of claim 8, wherein the attachment member comprises a threaded member that is positioned to extend away from the knob of the bat in a direction that is parallel to a barrel of the bat.

10. The system of claim 1, wherein the one or more sensors comprise an accelerometer, gyroscope, and/or inertial measurement unit.

11. The system of claim 1, wherein:
    the one or more sensors comprise a photosensor;
    the system also comprises a base station having a laser emitter; and
    the tracking device is configured to determine a position of the tracking device's photosensor with respect to the base station based on detection by the photosensor of a laser emitted by the base station.

12. The system of claim 1, wherein:
    the instructions to present the pitch comprise presenting the pitch in a pitch sequence mode that presents pitches to the batter as an actual set of pitches from a pitch sequence of the selected pitcher; and the instructions to select the simulated pitch comprise instructions to access the database that includes pitch data for the selected pitcher and select a pitch that follows a previously presented pitch in the pitch sequence.

13. A method of operating a virtual reality baseball system, the method comprising:
a wearable electronic device comprising a virtual reality display;
a tracking device comprising one more sensors that are configured to sense motion and/or position of a bat;
by a processor implementing programming instructions:
receiving, from a user interface, a selection of a pitcher, and
accessing a database that includes pitch data for actual pitches thrown by the selected pitcher and using a weighted randomization function to select a simulated pitch from the pitch data, wherein the weighted randomization function more highly weights pitches that the pitch data indicates that the selected pitcher has a relatively higher probability of being thrown;
by a virtual reality display device, displaying the simulated pitch;
by a tracking device comprising one more sensors that are configured to sense motion and/or position of a bat, receiving motion data that corresponds to a swing of the bat in response to the simulated pitch, and
by the processor:
analyzing the motion data,
using the motion data to generate batting statistics corresponding to the swing, and
saving the batting statistics to a data store.

14. The method of claim 13, wherein selecting the simulated pitch also comprises:
determining a batting simulation scenario that includes one or more characteristics of a batter who will use the bat;
using one or more of the characteristics of the batting simulation scenario to determine one or more batting simulation parameters;
accessing the database and identifying a set of candidate pitches that correspond to the one or more batting simulation parameters; and
selecting one of the candidate pitches as the simulated pitch.

15. The method of claim 14, wherein the one or more characteristics of the batter comprise one or more of the following: handedness; pitch count; number of outs; or data about previous hits or misses of prior pitch types by the batter.

16. The method of claim 13, wherein displaying the simulated pitch comprises occluding a first portion of the simulated pitch on the virtual reality display so that a user of the virtual reality display cannot view the entire simulated pitch.

17. The method of claim 16, further comprising:
by the processor, generating an additional simulated pitch from the selected pitcher; and
by the display device, displaying the additional simulated pitch while occluding a second portion of the simulated pitch, wherein the second portion is greater than the first portion.

18. The method of claim 13 further comprising, by the processor:
causing the display device to present at least a subset of the plurality of pitchers to a user;
receiving, from the user interface, the selection of the pitcher as one of the presented pitchers; and
when generating the simulated pitch, accessing a database comprising pitch characteristics for a plurality of pitchers and using pitch characteristics from the database for the selected pitcher to generate the simulated pitch.

19. The method of claim 13 further comprising, by the processor:
accessing a database comprising swing data for a user of the bat; and
causing the display device to present the batting statistics and swing data from the database to the user.

20. The method of claim 13, wherein:
the one or more sensors comprise a photosensor; and
the method further comprises, by the tracking device, determining a position of the tracking device's photosensor with respect to a base station having a laser emitted based on detection by the photosensor of a laser emitted by the base station.

21. The method of claim 13, wherein selecting the simulated pitch from the pitch data comprises selecting a pitch that follows a previously presented pitch in a pitch sequence, wherein the previously presented pitch was the last pitch displayed by the virtual reality display device prior to displaying the simulated pitch.

* * * * *